(12) United States Patent
Ur et al.

(10) Patent No.: US 9,916,688 B2
(45) Date of Patent: Mar. 13, 2018

(54) AUGMENTED REALITY SKIN MANAGER

(71) Applicant: EMPIRE TECHNOLOGY DEVELOPMENT, LLC, Wilmington, DE (US)

(72) Inventors: Shmuel Ur, Galil (IL); Yoav Medan, Haifa (IL)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 121 days.

(21) Appl. No.: 14/384,825

(22) PCT Filed: Jan. 31, 2014

(86) PCT No.: PCT/US2014/014201
§ 371 (c)(1),
(2) Date: Sep. 12, 2014

(87) PCT Pub. No.: WO2015/116179
PCT Pub. Date: Aug. 6, 2015

(65) Prior Publication Data
US 2016/0240004 A1    Aug. 18, 2016

(51) Int. Cl.
*G06T 19/00* (2011.01)
*G06T 19/20* (2011.01)
(Continued)

(52) U.S. Cl.
CPC ...... *G06T 19/006* (2013.01); *G06F 17/30268* (2013.01); *G06K 9/46* (2013.01); *G06T 19/20* (2013.01); *G06T 2219/2024* (2013.01)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS 6,672,961 B1 * 1/2004 Uzun .................. A63F 13/12
                                                    345/419
7,626,569 B2   12/2009 Lanier
(Continued)

FOREIGN PATENT DOCUMENTS

EP    1453002 A2    9/2004
GB    2488237 A     8/2012
(Continued)

OTHER PUBLICATIONS

"ARToolKit," accessed at https://web.archive.org/web/20131230032715/http://www.hitl.washington.edu/artoolkit/, accessed on Aug. 5, 2014, p. 1.
(Continued)

*Primary Examiner* — Todd Buttram
(74) *Attorney, Agent, or Firm* — Moritt Hock & Hamroff, LLP; Steven S. Rubin, Esq.

(57) ABSTRACT

Technologies are generally described for systems, devices and methods effective to set up image data to be processed by an augmented reality device. In some examples, a processor may generate image data from light reflected from a real object. The image data may represent, or may be a digital representation of, the real object. The processor may analyze a skin stack of augmented reality skins and identify one of the augmented reality skins stored in the memory. The augmented reality skin may include instructions effective to modify some of the image data when the image data includes a feature. The processor may create metadata related to the image data. The metadata may relate to the presence of the feature in the image data. The processor may store the metadata in the memory.

22 Claims, 9 Drawing Sheets

(51) Int. Cl.
*G06F 17/30* (2006.01)
*G06K 9/46* (2006.01)

(58) Field of Classification Search
CPC ........ G06F 3/011; G06F 3/012; G06F 3/0304;
G06T 19/00; G06T 17/00; G06T 19/006;
H04N 5/272; A63F 13/10
See application file for complete search history.

(56) References Cited

U.S. PATENT DOCUMENTS

| | | | |
|---|---|---|---|
| 8,190,939 B2 | 5/2012 | Fields, Jr. et al. | |
| 8,743,145 B1 | 6/2014 | Price | |
| 2004/0179037 A1 | 9/2004 | Blattner et al. | |
| 2005/0026685 A1 | 2/2005 | Ruark et al. | |
| 2005/0175101 A1 | 8/2005 | Honda et al. | |
| 2005/0286799 A1 | 12/2005 | Huang et al. | |
| 2007/0038944 A1 | 2/2007 | Carignano et al. | |
| 2007/0260984 A1 | 11/2007 | Marks et al. | |
| 2010/0302143 A1 | 12/2010 | Spivack | |
| 2011/0018903 A1 | 1/2011 | Lapstun et al. | |
| 2011/0055049 A1 | 3/2011 | Harper et al. | |
| 2011/0134108 A1 | 6/2011 | Hertenstein | |
| 2011/0138416 A1 | 6/2011 | Kang et al. | |
| 2011/0141254 A1 | 6/2011 | Roebke et al. | |
| 2011/0216089 A1 | 9/2011 | Leung | |
| 2011/0221659 A1 | 9/2011 | King, III et al. | |
| 2011/0258175 A1 | 10/2011 | Kim et al. | |
| 2011/0279446 A1 | 11/2011 | Castro | |
| 2011/0283223 A1 | 11/2011 | Vaittinen | |
| 2012/0001939 A1 | 1/2012 | Sandberg | |
| 2012/0019547 A1 | 1/2012 | Tjen et al. | |
| 2012/0092370 A1 | 4/2012 | Oh et al. | |
| 2012/0122529 A1 | 5/2012 | Lyons | |
| 2012/0240077 A1 | 9/2012 | Vaitiinen et al. | |
| 2012/0249741 A1 | 10/2012 | Maciocci et al. | |
| 2012/0262485 A1 | 10/2012 | Raghoebardajal et al. | |
| 2012/0327196 A1 | 12/2012 | Ohba et al. | |
| 2013/0016123 A1* | 1/2013 | Skarulis | G09G 5/00 345/633 |
| 2013/0038633 A1 | 2/2013 | Maggiore | |
| 2013/0044129 A1* | 2/2013 | Latta | G09G 5/00 345/633 |
| 2013/0049976 A1 | 2/2013 | Maggiore | |
| 2013/0057544 A1 | 3/2013 | Oh | |
| 2013/0063487 A1 | 3/2013 | Spiegel et al. | |
| 2013/0093790 A1 | 4/2013 | Jin | |
| 2013/0106867 A1* | 5/2013 | Joo | G06T 13/00 345/473 |
| 2013/0106900 A1* | 5/2013 | Joo | G06T 11/001 345/593 |
| 2013/0128022 A1 | 5/2013 | Bose et al. | |
| 2013/0147837 A1 | 6/2013 | Stroila | |
| 2013/0293584 A1 | 11/2013 | Anderson | |
| 2014/0015987 A1* | 1/2014 | Harple | G06F 3/005 348/207.1 |
| 2014/0173508 A1 | 6/2014 | Berry et al. | |
| 2014/0306982 A1* | 10/2014 | Ollivier | A45D 44/005 345/589 |
| 2015/0084989 A1 | 3/2015 | Laughlin et al. | |
| 2015/0097812 A1 | 4/2015 | Huang et al. | |
| 2015/0097862 A1 | 4/2015 | Reisner-Kollmann et al. | |
| 2015/0123966 A1 | 5/2015 | Newman | |
| 2016/0063671 A1 | 3/2016 | Piippo | |

FOREIGN PATENT DOCUMENTS

| | | |
|---|---|---|
| JP | 2007216000 A | 8/2007 |
| KR | 20120070985 A | 7/2012 |
| WO | 2010024486 A1 | 3/2010 |
| WO | 2011146776 A1 | 11/2011 |
| WO | 2013023705 A1 | 2/2013 |
| WO | 2013049248 A2 | 4/2013 |

OTHER PUBLICATIONS

"Creator Program," accessed at https://web.archive.org/web/20130525200037/http://www.imvu.com/creators/about_the_program.php, accessed on Aug. 5, 2014, pp. 1-2.

"Glass Platform Developer Guidelines," accessed at https://web.archive.org/web/20131109171046/https://developers.google.com/glass/guidelines, Last modified Aug. 12, 2013, pp. 1-2.

"Inventory From Second Life Wiki," accessed at https://web.archive.org/web/20130907075454/http://wiki.secondlife.com/wiki/Inventory, Mar. 19, 2012, pp. 1-4.

Kokkevis, V., "GPU Accelerated Compositing in Chrome," Accessed at http://web.archive.org/web/20131210233722/http://www.chromium.org/developers/design-documents/gpu-accelerated-compositing-in-chrome, Accessed at Aug. 5, 2014, pp. 9.

"Pipeline (software)," Wikipedia, accessed at http://web.archive.org/web/20130123092009/http://en.wikipedia.org/wiki/Pipeline_(software), last modified on Jan. 3, 2013, pp. 1-5.

"Second Life Market Place," accessed at https://web.archive.org/web/20131104081053/https://marketplace.secondlife.com/products/search?search%5Bcategory_id%5D=33, Accessed on Aug. 5, 2013, pp. 1-10.

Carmigniani, J. and Furht, B. "Augmented Reality: An Overview," Handbook of Augmented Reality, 2011, pp. 3-46, Springer Science + Business Media.

Cobzas, D., et al., "Editing Real World Scenes: Augmented Reality with Image-based Rendering," In Proceedings of IEEE, 2003, pp. 291-292.

Columbus, L., "Gartner's Mobile App Store Forecast Predicts $26B in Sales, 102B Downloads in 2013," posted on Sep. 21, 2013, Accessed at http://www.forbes.com/sites/louiscolumbus/2013/09/21/gartners-mobile-app-store-forecast-predicts-26b-in-sales-102b-downloads-in-2013/?utm_campaign=techtwittersf&utm_source=twitter&utm_medium=social, Accessed on Aug. 5, 2014, pp. 6.

Gimeno, J. "An Advanced Authoring Tool for Augmented Reality Applications in Industry," In proceeding of: Actas de las XXIII Jornadas de Paralelismo, Sep. 21, 2012, pp. 6.

Huang, C., et al., "Directions for Peer-to-Peer based mobile pervasive augmented reality gaming," International Conference on Parallel and Distributed Systems, 2007, pp. 1-8, vol. 2.

Inger, Y., "REAL-time Image Blending for Augmented Reality on Mobile Phones," Jun. 2, 2011, pp. 1-16.

International Search Report and Written Opinion for International Application No. PCT/US2014/014201, dated Jun. 26, 2014, 10 pages.

International Search Report and Written Opinion for International Application No. PCT/US2014/014207, dated Jun. 25, 2014, 11 pages.

International search report and Written Opinion for international application No. PCT/US2014/014212, dated Jun. 23, 2014, 9 pages.

International Search Report and Written Opinion for International Application No. PCT/US2014/014223, dated Jun. 26, 2014, 10 pages.

Law, A., "Photoshop Quick Tip: Finding Layers Quickly," accessed at https://web.archive.org/web/20131007002057/http://www.gomediazine.com/tutorials/photoshop-quick-tip-finding-layers-quickly/, Gomedia, Jul. 27, 2009, pp. 1-4.

Leetaru, K. H., "ShadowLight: an immersive environment for rapid prototyping and design," Proceedings of the SPIE, 2005, pp. 606-615, vol. 5664.

Lepetit, V., et al., "Real-Time Augmented Face," In Proc. International Symposium on Mixed and Augmented Reality, 2003, pp. 1-2.

Patterson, S., "Photoshop Layers Essential Power Shortcuts," accessed at https://web.archive.org/web/20131118090620/http://www.photoshopessentials.com/basics/layer-shortcuts/, accessed on Aug. 5, 2014, pp. 1-12.

Philg, "Legal and social issues due to Google Glass?," accessed at https://web.archive.org/web/20140615133037/http://blogs.law.harvard.edu/philg/2013/05/31/legal-and-social-issues-due-to-google-glass/, May 31, 2013, pp. 1-4.

(56) References Cited

OTHER PUBLICATIONS

Renukdas, P. et al., "Markerless Augmented Reality Android App for Interior Decoration," International Journal of Engineering Research & Technology (IJERT), 2013, pp. 1367-1373, vol. 2 Issue 4.

Rosten, E., et al., "Real-time Video Annotations for Augmented Reality," Advances in Visual Computing, Lecture Notes in Computer Science, 2005, pp. 294-302, vol. 3804.

Stankovic, S. and Rakkolainen, I., "Augmented Reality," SGN-5406 Virtual Reality, 2012, pp. 1-71.

Tennant, D., "How Augmented Reality Will Help Close the Skills Gap," accessed at http://web.archive.org/web/20130613042449/http://www.itbusinessedge.com/blogs/from-under-the-rug/how-augmented-reality-will-help-close-the-skills-gap.html, IT Business Edge, Jan. 9, 2013, pp. 1-8.

Wiltzuis, T., "Accelerated Rendering in Chrome," accessed at https://web.archive.org/web/20131129024711/http://www.html5rocks.com/en/tutorials/speed/layers, Mar. 11, 2013, pp. 1-9.

Extended European Search Report for European Patent Application No. 14880509 dated Sep. 22, 2017, pp. 9.

Extended European Search Report for European Patent Application No. 14880818 dated Aug. 28, 2017, pp. 6.

Extended European Search Report for European Patent Application No. 14881088 dated Jun. 6, 2017, pp. 10.

Extended European Search Report for European Patent Application No. 14881231 dated May 26, 2017, pp. 9.

Shapira, L., et al., "Layout Design for Augmented Reality Applications," Microsoft, accessed at https://www.microsoft.com/en-us/research/publication/layout-design-for-augmented-reality-applications/, Jan. 1, 2014, pp. 3.

\* cited by examiner

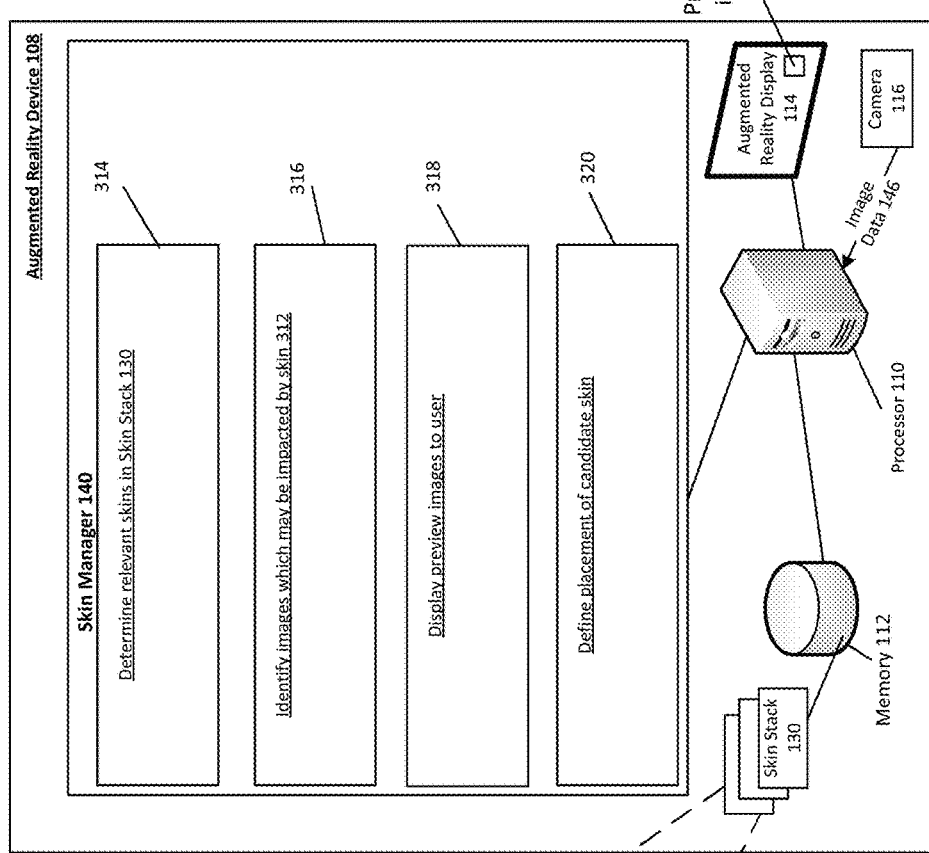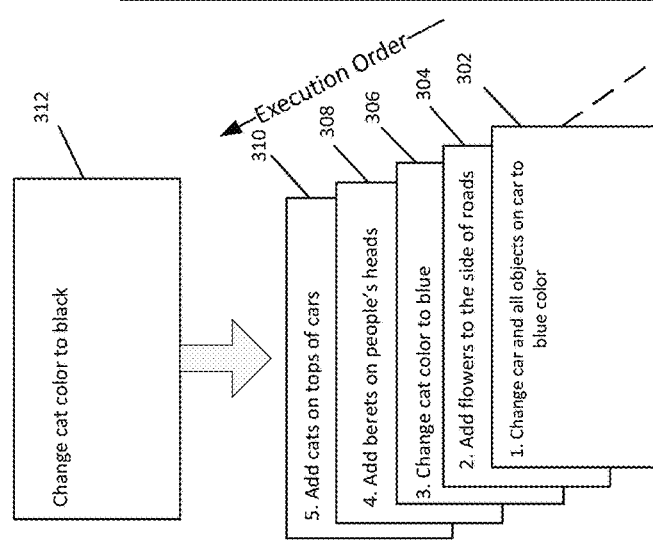
Fig. 3

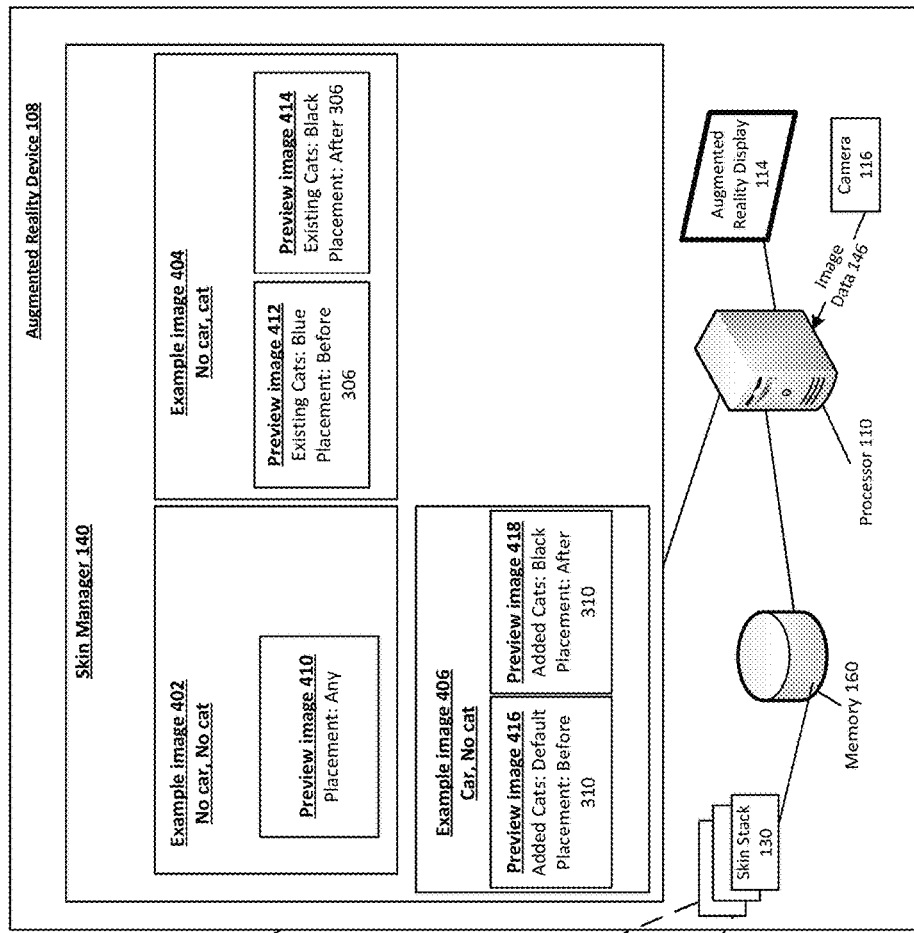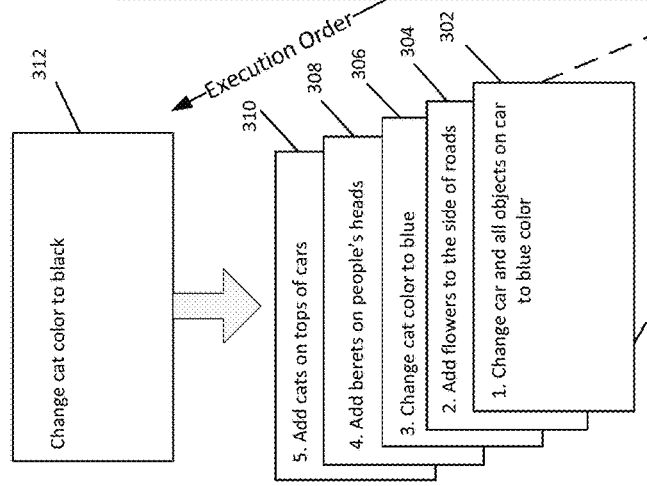
Fig. 4

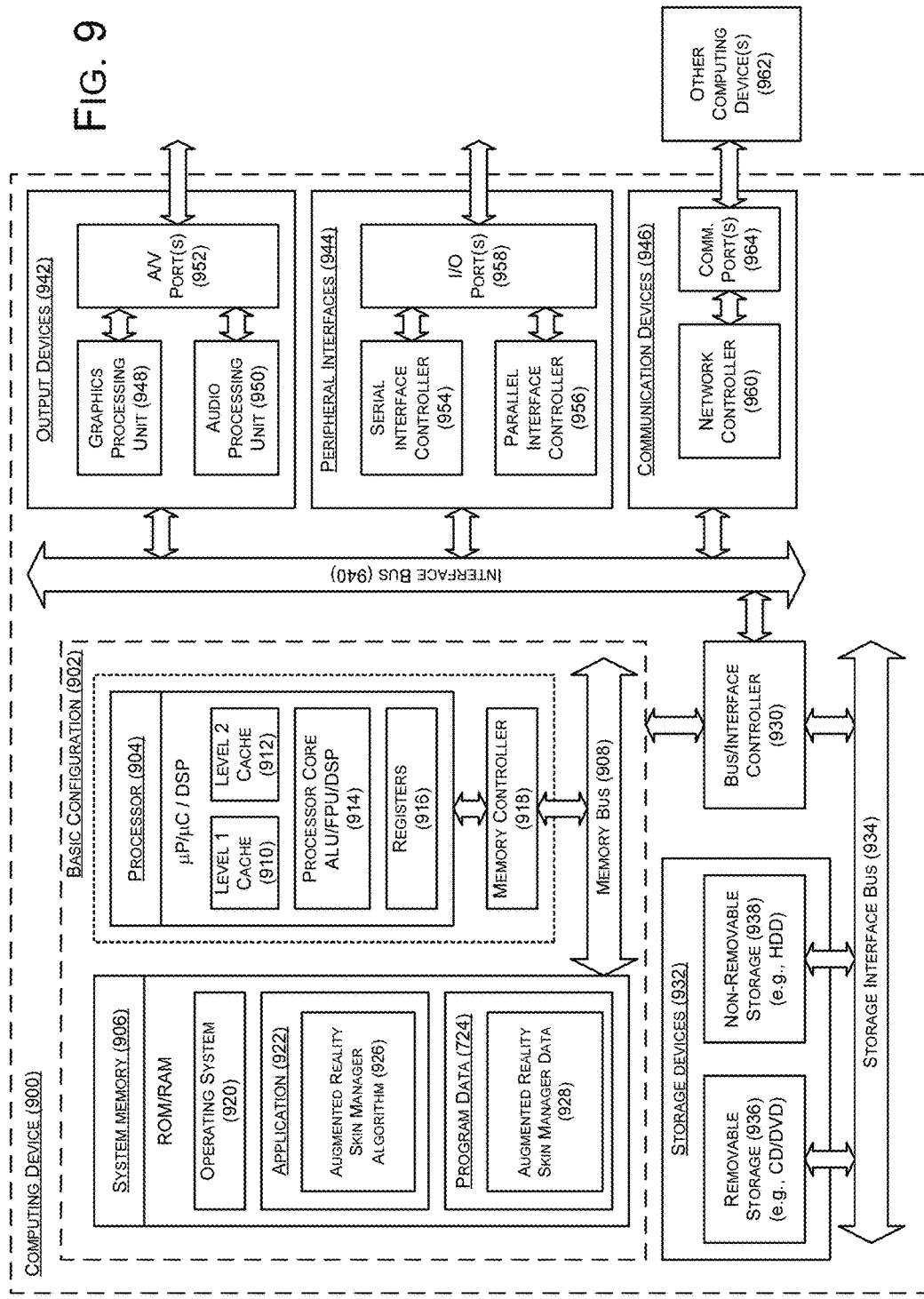

AUGMENTED REALITY SKIN MANAGER

CROSS-REFERENCE TO RELATED APPLICATIONS

This application is the U.S. National Stage filing under 35 U.S.C. § 371 of International Application No. PCT/US2014/014201 filed on Jan. 31, 2014, the entirety of which is hereby incorporated by reference. This application is related to U.S. Application No. 14/384,870, filed on Jan. 31, 2014, entitled "Augmented Reality Skin Evaluation,"U.S. application Ser. No. 14/384,887, filed on Jan. 31, 2014, entitled "Subject Selected Augmented Reality Skin," and U.S. application Ser. No. 14/384,917, filed on Jan. 31, 2014, entitled "Evaluation of Augmented Reality Skins".

BACKGROUND

Unless otherwise indicated herein, the materials described in this section are not prior art to the claims in this application and are not admitted to be prior art by inclusion in this section.

Augmented reality may use the real world as a background and add a layer of augmented information. A sensor may capture real image information. A processor may change the captured real information by adding augmented information about the real world image. For example, an image of a real building may be displayed as an image of a Victorian era building.

SUMMARY

In one example, methods for setting up image data to be processed by an augmented reality device are generally described. The methods may include, by a processor, generating image data from light reflected from a real object. The image data may represent the real object. The methods may also include, by the processor, storing the image data in a memory. The methods may also include, by the processor, identifying an augmented reality skin stored in the memory. The methods may also include, by the processor, identifying a feature upon which the augmented reality skin registers. The methods may further include, by the processor, creating metadata related to the image data. The metadata may relate to the presence of the feature in the image data. The methods may further include, by the processor storing the metadata in the memory.

In one example, methods for determining whether to execute an augmented reality skin by an augmented reality device are generally described. The methods may include, by a processor, generating image data from light reflected from a real object. The image data may represent the real object. The methods may also include, by the processor, storing the image data in a memory. The methods may also include, by the processor, identifying an augmented reality skin to be applied to the image data. The methods may also include, by the processor, defining one or more restrictions on the execution of the augmented reality skin. The methods may also include, by the processor, receiving a request to execute the augmented reality skin. The methods may also include, by the processor, determining whether execution of the augmented reality skin would violate at least one of the restrictions. The methods may also include, by the processor, executing the augmented reality skin when the determination indicates that execution of the augmented reality skin would not violate at least one of the restrictions.

In one example, augmented reality devices are generally described. The augmented reality devices may include a memory. The memory may include an augmented reality skin. The augmented reality devices may further include a processor configured to be in communication with the memory. The augmented reality devices may further include a camera configured to be in communication with the processor. The camera may be effective to capture light reflected from a real object. The processor may be effective to generate image data from the light. The image data may represent the real object. The processor may also be effective to store the image data in the memory. The processor may also be effective to identify the augmented reality skin stored in the memory. The processor may also be effective to identify a feature upon which the augmented reality skin registers. The processor may also be effective to create metadata related to the image data. The metadata may relate to the presence of the feature in the image data. The processor may be further effective to store the metadata in the memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 depicts the example system of FIG. 1, illustrating additional details related to execution order of skins;

FIG. 4 depicts the example system of FIGS. 1, 2, and 3, with additional details relating to preview images;

FIG. 9 is a block diagram illustrating an example computing device that is arranged to implement an augmented reality skin manager; all arranged according to at least some embodiments described herein.

DETAILED DESCRIPTION

Figure 1:
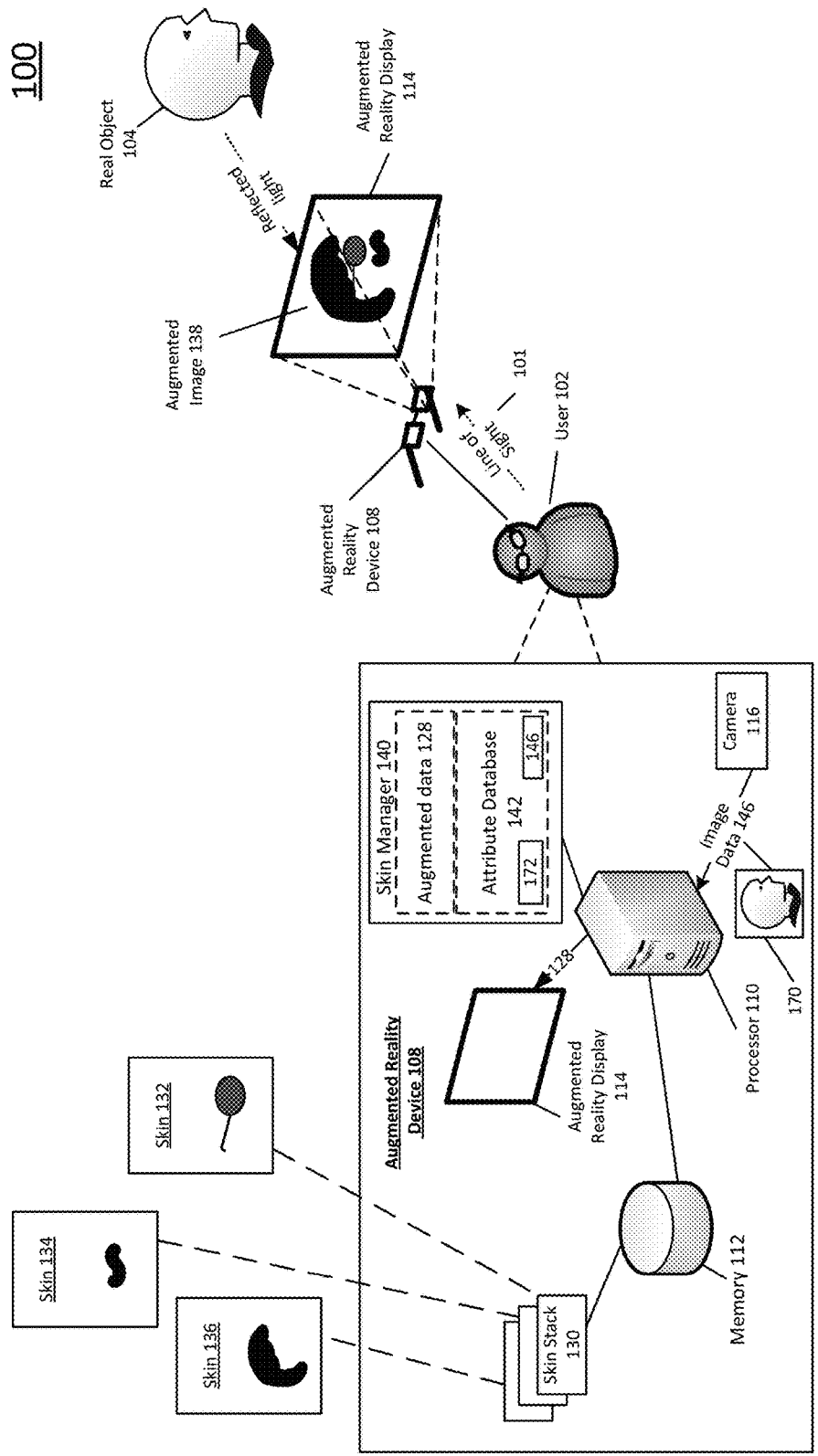
FIG. 1 illustrates an example system that can be utilized to implement an augmented reality skin manager.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to an augmented reality skin manager.

Briefly stated, technologies are generally described for systems, devices and methods effective to set up image data to be processed by an augmented reality device. In some examples, a processor may generate image data from light reflected from a real object. The image data may represent, or may be a digital representation of, the real object. The processor may analyze a skin stack of augmented reality skins stored in a memory and identify one of the augmented reality skins stored in the memory. The augmented reality skin may include instructions effective to modify some of the image data when the image data includes a feature. The processor may create metadata related to the image data. The metadata may relate to the presence of the feature in the image data. The processor may store the metadata in the memory.

FIG. 1 illustrates an example system 100 that can be utilized to implement an augmented reality skin manager, arranged in accordance with at least some embodiments described herein. System 100 may include an augmented reality device 108. Augmented reality device 108 may include a processor 110, a memory 112, an augmented reality display 114, a skin manager 140 and/or a camera 116. Skin manager 140 may be implemented in hardware and/or implemented as instructions executable in hardware or some combination thereof. In some examples, augmented reality device 108 may be a mobile phone, tablet computer, wearable device such as augmented reality glasses, or another computing device. Processor 110 may be configured to be in communication with memory 112, augmented reality display 114, skin manager 140 and/or camera 116. Memory 112 may store a skin stack 130. Skin stack 130 may include one or more skins, including, for example, skins 132, 134, and/or 136.

Camera 116 may capture light reflected from real object 104 and may generate image data 146 in response to receipt of the reflected light. For example, camera 116 may include a charged coupled device that may convert photons in received reflected light into electrical signals such as voltage potentials with logic "0" and "1" values. Skin manager 140 may receive image data 146 from camera 116. As shown in FIG. 1, if image data 146 were rendered on augmented reality display 114, the result would be image 170—which corresponds to real object 104. Skin manager 140 may be effective to perform one or more of the operations, further described below, via processor 110 of augmented reality device 108. In an example, skin manager 140, processor 110 and/or memory 112 may be located within a housing of augmented reality device 108 or in one or more other computing devices configured to be in communication with augmented reality device 108.

Skin manager 140 may include an attribute database 142. Attribute database 142 may be a data structure configured to store metadata 172 related to features identified by augmented reality skins and in image data 146. Skin manager 140 may identify features of objects found in image data 146. Features of objects may be things upon which augmented reality skins register—such as a cat, a car, lips of a human, nose of a human, etc. Augmented reality skins may identify these features and change pixel data based on these features. Skin manager 140 may store metadata related to the identified features of objects in attribute database 142. The features whose metadata is stored in attribute database 142, may be identified by skins 132, 134, 136 in skin stack 130. For example, skin manager 140 may store metadata 172 in attribute database 142. In an example, metadata 172 may be related to the location, color, position, size and/or identification of features found in image data 146. For example, metadata 172 may indicate that lips are among the features present in image data 146. Additionally, metadata 172 may indicate that data relating to the feature lips are stored at locations x1, y1 to x2, y2. As explained in more detail below, lips may be a reference point identified by one or more skins in skin stack 130. Attribute database 142, and contents of attribute database 142, may be stored in memory 112 or in another memory.

As will be discussed in more detail below, skin manager 140 may be further configured to apply one or more skins to image data 146. Skin manager 140 may modify portions of image data 146 to generate augmented data 128 through execution of one or more skins stored in memory 112. Augmented data 128 may be rendered on augmented reality display 114 to produce augmented image 138.

Augmented data 128 may be produced as a result of the execution of skins 132, 134, and/or 136 by skin manager 140. In an example, skin manager 140 may sequentially execute skins 132, 134 and/or 136 in a defined execution order. In another example, skin manager 140 may execute augmented reality skins 132, 134 and/or 136 in parallel, when skins being executed do not implicate the same features of image data 146. Upon completion of execution of skins 132, 134, and/or 136, skin manager 140 may render augmented data 128 on augmented reality display 114 to produce augmented image 138. In some examples, skin manager 140 may execute one or more skins, but less than the total number of skins stored in memory 112, to generate intermediate augmented data.

Skins 132, 134 and/or 136 may include instructions and/or skin data. To facilitate discussion, skins 132, 134, 136, and some data, are illustrated in the figures with images reflecting what the skin data would look like if rendered on augmented reality display 114 after application of the skin instructions. Skin data in skins 132, 134, and/or 136 may be pixel values. Instructions in skins 132, 134, and/or 136 may be procedures to identify a reference point of a feature found in image data 146. Instructions may also replace pixels associated with the feature with respective skin data. In an example, skin 134 may identify the feature "lips". Skin manager 140 may determine whether to execute skin 134 by analyzing metadata 172 for the feature "lips".

If skin manager 140 determines that lips are among the features stored in attribute database 142, skin manager 140 may execute skin 134. Execution of skin 134 may produce augmented data 128. Augmented data 128 may be produced by replacing pixels associated with the feature lips with skin data. For example, for skin 134, pixels corresponding to a mustache may replace pixels corresponding to lips. Augmented data 128 may be rendered on augmented reality display 114 to produce augmented image 138. In the example, augmented image 138 may place a mustache on augmented reality display 114 at a position overlaying the location of the lips of real object 104. In the example, augmented image 138 may appear through augmented reality device 108 to overlay real objects 104 along line of sight 101, such that the upper lip of a person in real object 104 is no longer visible through augmented reality display 114 due to the rendered mustache.

A user 102 may view real object 104 along line of sight 101 using augmented reality device 108, such as by wearing augmented reality device 108 or positioning augmented reality device 108 between an eye of user 102 and real object 104. User 102 may see augmented image 138 on augmented reality display 114 overlapping real objects 104 along line of sight 101.

Figure 2:
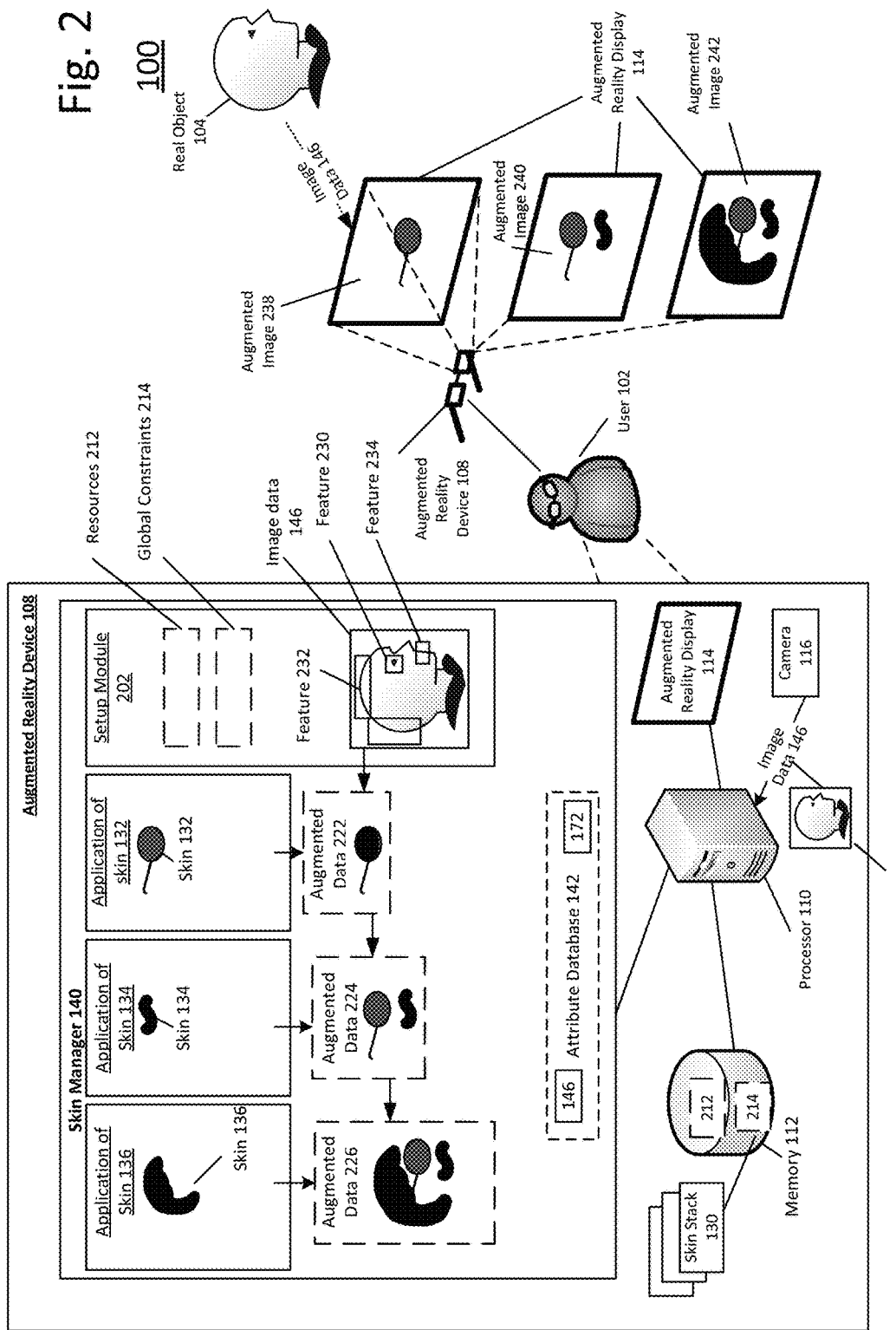
FIG. 2 depicts the example system of FIG. 1, illustrating an example where the skin manager is configured to apply two or more augmented reality skins.

FIG. 2 depicts the example system 100 of FIG. 1, illustrating an example where the skin manager is configured to apply two or more skins, arranged in accordance with at least some embodiments described herein. Those components in FIG. 2 that are labeled identically to components of FIG. 1 will not be described again for the purposes of clarity and brevity.

In an example, skin 132, may include skin data corresponding to sunglasses and when executed and applied, may be configured to overlay sun-glasses over the eyes of humans on augmented reality display 114. Skin 134, may include skin data corresponding to a mustache, and when executed and applied, may be configured to overlay a mustache over the lips of humans on augmented reality display 114. Skin 136, may include skin data corresponding to hair and, when executed and applied, may be configured to overlay blue hair on the heads of humans on augmented reality display 114. As will be discussed below, skins 132, 134 and/or 136 may be executed in any defined order. In an example, the order may be determined automatically by skin manager 140. In another example, the order may be determined by user 102 based on preview images of the skins being applied in different orders.

In another example, a particular skin may be prescribed a maximum amount of time in which the skin must be executed. The time period for execution may begin to run at the time at which image data 146 is generated and may stop running at the time at which the particular skin is executed. A first skin with a prescribed maximum amount of time which is less than the prescribed maximum amount of time for a second skin may be applied before the second skin. The prescribed maximum amount of time in which a particular skin must be executed may depend on a required frequency of execution for the particular skin (e.g. 15 frames/second) and/or on the number of skins in skin stack 130. The prescribed maximum amount of time in which a particular skin must be executed may be determined and/or calculated at a time when a feature upon which the particular skin registers is identified in metadata 172. In other examples, the prescribed amount of time in which a particular skin must be executed may be determined periodically, upon user demand, and/or at a time when the particular skin is removed from skin stack 130. The order of application of skins may be stored by skin manager 140 in memory 112.

Skin manager 140 may execute skins 132, 134 and 136, in that execution order, to produce augmented data 222, 224, 226, respectively. Skin manager 140 may include a setup module 202. Setup module 202 may be hardware or may be a combination of hardware and instructions executable in the hardware. Setup module 202 may receive image data 146 generated by camera 116. Setup module 202 may store image data 146 in attribute database 142 or in memory 112. Setup module 202 and/or skin manager 140 may identify and store metadata 172 in attribute database 142. In an example, real object 104 may include a human standing in a field. Image data 146 may be data representing the human standing in the field and may be sent by camera 116 to skin manager 140. Metadata 172 may identify human lips, a human head, the field, etc., as features of image data 146.

In further execution of setup module 202, skin manager 140 may analyze skins in skin stack 130 and identify features upon which skins 132, 134, 136 register. In the example, skin 132 registers on a feature "eye," skin 134 registers on a feature "lip," and skin 136 registers on a feature "head." Skin manager 140 may then identify features in image data 146 upon which skins 132, 134, 136 register. Skin manager 140 may create and store metadata 172 identifying the features in image data 146. For example, metadata 172 may identify a feature 230. Feature 230 may be a human eye. Metadata 172 may indicate a position of feature 230 (e.g., from x1, y1 to x2, y2). Similarly, skin manager 140 may store metadata 172 related to other features, such as features 232 and 234. Features 232 and 234 may represent the top of a human's head and a human's lips, respectively. Metadata 172 may identify positions of features 232 and 234. Metadata 172 may further include information such as size, color, depth, transparency, etc. of the respective features.

Setup module 202 may determine one or more restrictions on one or more skins to be executed. In an example of a restriction, setup module 202 may allocate a finite amount of resources 212, for one or more skins to be executed. For example, setup module 202 may allocate resources 212 for skins currently stored in skin stack 130. Setup module 202 may store an indication of the allocated amount of resources 212 in memory 112. In some examples, resources 212 may include memory, processing power, latency guarantees, and/or refresh rates. Resources 212 may guarantee timely performance of skins (e.g., limitations on presentation delay and response time to user input). In another example of a restriction, skin manager 140 may define global constraints 214 for image data 146. Global constraints 214 may be constraints on altering features in image data 146 identified by metadata 172. Global constraints 214 may relate to security, privacy and/or visual appearance of features in image data 146 and identified by metadata 172. For example, a global constraint 214 may prevent skin manager 140 from altering faces identified by metadata 172. In another example, the amount of display area of augmented reality display 114, which may be modified by different skins, may be limited by global constraints 214.

When skins are to be applied to image data 146, skin manager 140 may analyze memory 112 and determine an order to apply the skins. In an example, the order may be skin 132, followed by skin 134 and then skin 136. Skin manager 140 may identify skin 132 and determine on what feature(s) skin 132 may be registered. In an example, skin 132 may include data and instructions effective to produce augmented data 222. Augmented data 222 may be data that, if rendered, displays sunglasses at a location on augmented reality display 114 corresponding to the location of feature 230 ("eyes"). Skin manager 140 may analyze attribute database 142 to determine if the feature eyes are present among the features identified by metadata 172. If skin manager 140 determines that feature 230 is not present in attribute database 142, skin manager 140 may deny execution of skin 132. If skin 132 does not have a defined feature, such as if skin 132 applied to an entire image or if a decision regarding whether feature 230 is present in metadata 172, skin manager 140 may execute skin 132. As skin manager 140 analyzes attribute database 142 instead of analyzing image data 146, skin manager 140 may quickly be able to determine whether skin 132 should be applied.

If skin manager 140 determines that feature 230 ("eyes") is present in attribute database 142, skin 132 may identify the amount and type of resources required by skin 132. Skin manager 140 may determine if the required resources for skin 132 are available among resources 212. If the resources required by skin 132 are not available among resources 212, skin 132 may be denied execution by skin manager 140. If the resources required by skin 132 are available among resources 212, skin manager 140 may execute skin 132 by applying skin 132 to image data 146. Additionally, skin manager may monitor resource consumption (or use) by skin 132 during execution. If skin 132 exceeds a resource allocation threshold during execution, skin manager 140 may terminate execution of skin 132. In another example where skin 132 violates a resource allocation threshold during execution, skin manager 140 may output a prompt to user 102. The prompt may allow user 102 to decide whether or not to terminate execution of skin 132.

Skin manager 140 may execute skin 132 based on a determination that feature 230 is among the features present in attribute database 142. Execution of skin 132 on image data 146 may produce augmented data 222. In the example, augmented data 222 may be data that, if rendered, may display sun-glasses at a position on augmented reality display 114 over the human eye of real object 104. Skin manager 140 may store augmented data 222 in memory 112.

After execution of skin 132, skin manager 140 may update metadata 172 in attribute database 142. In an example, processor 110 may modify metadata 172 such that feature 230 is replaced with "sun-glasses" instead of "eyes" and the feature "eyes" may be removed from metadata 172 because of the production of augmented data 222 that would overlay feature 230 if rendered. Skin manager 140 may modify metadata 172 to store updated information related to feature 230 based on augmented data 222. For example, metadata 172 may be modified with information related to position, color, transparency, and/or depth of features in augmented data 222 such as the position of the eye patch.

If skin 132 is the final skin in skin stack 130 which is to be executed, skin manager 140 may render augmented data 222 on augmented reality display 114 to produce augmented image 238. Augmented image 238 may be displayed to user 102 on augmented reality display 114. In the current example, augmented image 238 may display an image of sun-glasses, which may appear over the eyes of the human. If skin 132 is not the final skin in skin stack 130 which is to be executed, skin manager 140 may receive the next consecutive skin in skin stack 130. In the example depicted in FIG. 2, skin 134 may be the next consecutive skin, followed by skin 136. Skin manager 140 may execute skins 134 and 136 in a similar manner as described above with respect to skin 132.

In an example, skin 134 may be the next consecutive skin in skin stack 130. In an example application of skin 134, skin manager 140 may determine on what feature(s) skin 134 is registered. In an example, skin 134 may include data and instructions effective to produce augmented data 224. Augmented data 224 may be data that, if rendered, displays a mustache at a location on augmented reality display 114 corresponding to feature 234 ("lips"). Skin manager 140 may analyze attribute database 142 to determine if lips are present among the features identified by metadata 172. If skin manager 140 determines that feature 234 is not present in attribute database 142, skin manager 140 may deny execution of skin 134.

If skin manager 140 determines that feature 234 ("lips") is present in attribute database 142, skin 134 may identify the amount and type of resources required by skin 134. Skin manager 140 may determine if the required resources for skin 134 are available among resources 212. If the resources required by skin 134 are not available among resources 212, skin 134 may be denied execution by skin manager 140. If the resources required by skin 134 are available among resources 212, skin manager 140 may execute skin 134 by applying skin 134 to augmented data 222 based on metadata 172. Execution of skin 134 may produce augmented data 224. Rendering augmented data 224 may produce augmented image 240. Similarly, skin 136 may be executed to produce augmented data 226. Rendering augmented data 226, 224 and 222 may produce augmented image 242.

Among other possible features, a system in accordance with the disclosure may improve the efficiency of augmented reality skin execution by detecting whether or not features upon which the skins register are present in an image prior to executing the skin. By executing augmented reality skins when features are present, processing power and memory usage may be conserved. Additionally, speed may be improved as certain skins may not be needlessly executed. The system may allow for prioritization of skin execution based on available resources or user preferences. The system may also provide security constraints for augmented reality skins, which may limit what parts of the image data a skin is able to modify.

FIG. 3 depicts the example system 100 of FIGS. 1 and 2, illustrating additional details relating to an execution order of skins, arranged in accordance with at least some embodiments described herein. Those components in FIG. 3 that are labeled identically to components of FIGS. 1 and 2 will not be described again for the purposes of clarity and brevity.

A user may be able to use processor 110 to acquire skins populate skin stack 130. When acquiring the skins, the user may select a placement in skin stack 130 defining an execution order in which the skins may be executed. Different placements of an augmented reality skin in the execution order may yield different augmented images. As is explained below, system 100 may output preview images 330 reflecting potential augmented reality images that may be produced based on different placement of candidate skin 312 in the execution order.

In an example, skin stack 130 may include five skins, including skins 302, 304, 306, 308 and 310. Skin 302 may be configured to produce augmented data that, if rendered, changes a car color and all objects on a car to a blue color. Skin 304 may be configured to produce augmented data that, if rendered, adds flowers to the sides of roads. Skin 306 may be configured to produce augmented data that, if rendered, changes the color of cats to blue. Skin 308 may be configured to produce augmented data that, if rendered, adds berets on people's heads. Skin 310 may be configured to produce augmented data that, if rendered, adds cats on tops of cars. A user of augmented reality device 108 may want to add a new skin to skins in skin stack 130. In an example, a user may want to add candidate skin 312 to skin stack 130. Candidate skin 312 may be configured to produce augmented data that, if rendered, may change the color of cats to black. Changing the placement of candidate skin 312 in skin stack 130 by skin manager 140, defining the execution order, may alter the composite image visible to a user of augmented reality device 108.

Processor 110 may store an execution order of skins 302, 304, 306, 308 and 310 within skin stack 130. For example, the execution order may indicate that processor 110 should execute skin 302 first. The execution order may indicate that processor 110 should execute skin 304 second, after execution of skin 302; execute skin 306 third, after execution of skin 304; execute skin 308 fourth, after execution of skin 306; and execute skin 310 fifth, after execution of skin 308.

In processing candidate skin 312, at operation 314, skin manager 140 may be configured to determine relevant skins in skin stack 130 which may affect, or be impacted by, the rendering of augmented data produced by execution of candidate skin 312. Relevant skins may be skins that pertain to the same feature as candidate skin 312. For example, relevant skins may register on the same feature as candidate skin 312 or may produce augmented data that includes a feature upon which candidate skin 312 registers. In the current example, skin manager 140 may determine that skins 302, 306, and 310 are relevant skins. Skins 304 and 308 may not have any effect on execution of skin 312 as skins 304 and 308 do not pertain to the feature "cats." By contrast, skins 302, 306 and 310 may affect or impact a rendering of augmented data produced by execution of skin 312, as skins 302, 306 and 310 may pertain to the feature "cats." For example, skin 306 may pertain to the feature "cats" as skin 306, when executed, changes a cat color to blue. Similarly, skin 310 may pertain to the feature "cats" as skin 310 may add cats to the tops of cars. Skin 302 may pertain to the feature "cats," because in skin 302 all objects on a car are turned blue.

At operation 316, skin manager 140 may be configured to identify example images which may be used to illustrate different placements of candidate skin 312 in skin stack 130. Example images may include different combinations of features which may have an effect on execution of skin 312. Example images may be stored in memory 112 or in another memory. For example, example images may be stored in a memory associated with a computing device from which augmented reality device 108 may acquire one or more augmented reality skins, such as a skin shop computing device. In the current example, skin manager 140 may determine that there are four example images: 1) An image with no cats and no cars, 2) an image with at least one cat and no cars, 3) an image with no cats and at least one car, and 4) an image with at least one cat and at least one car. As will be discussed in further detail below, at operation 318, preview images may be displayed reflecting multiple different placements of candidate skin 312 in the execution order. A user may select an image from among displayed preview images. Based on the user selection, at operation 320, skin manager 140 may be configured to define a placement of candidate skin 312 at a position in the execution order.

FIG. 4 depicts the example system of FIGS. 1, 2 and 3 with additional details relating to preview images, arranged in accordance with at least some embodiments described herein. Those components in FIG. 4 that are labeled identically to components of FIGS. 1, 2 and 3 will not be described again for the purposes of clarity and brevity.

Processor 110 may display preview images 410, 412, 414, 416 and 418, to a user based on different possible example images 402, 404 and 406 and different possible placements of candidate skin 312 in the execution order. Preview images 410, 412, 414, 416 and 418 may be displayed on augmented reality display 114 or on another display device. The placement of candidate skin 312 relative to non-relevant skins 304 and 308 may have no effect on images produced via execution of skins 302, 304, 306, 308, 310 and 312. Therefore, candidate skin 312 may be placed before or after skins 304 and 308 in the execution order without any effect. Processor 110 may display preview images based on relevant skins 302, 306, 310 and need not process preview images for non-relevant skins 304, 308.

With respect to example image 402, which may include no cars and no cats, processor 110 may generate and display preview image 410 for a user. Since example image 402 includes no cars and no cats execution of skin 312 has no effect on example image 402. Therefore, preview image 410 may be the same regardless of the placement of candidate skin 312.

With respect to example image 404, which may include no car and at least one cat, processor 110 may generate and display preview images 412, 414 to a user. Processor 110 may determine that only skin 306 is relevant because example image 404 has no car. Preview images may illustrate what would happen if candidate skin 312 were placed before or after skin 306. Preview image 412 may be a representative image where candidate skin 312 is placed prior to relevant skin 306. Preview image 414 may be a representative image where candidate skin 312 is placed after skin 306. If skin 312 is executed prior to skin 306, the at least one existing cat in example image 404 may appear to be colored blue. In this example, the at least one existing cat may be colored blue because candidate skin 312 will be applied (changing color of cats to black) prior to skin 306 being applied (changing color of cats to blue). Conversely, if skin 312 is placed in skin stack 130 and executed after skin 306, the at least one existing cat in example image 404 may appear to be colored black. In this example, the at least one existing cat may be colored black because skin 306 will be applied (changing color of cats to blue) prior to candidate skin 312 being applied (changing color of cats to black).

With respect to example image 406, which may include at least one car and no existing cats, processor 110 may generate and display preview images 416 and 418. Processor 110 may determine that only skin 310 is relevant. Preview images may illustrate what would happen if candidate skin 302 were placed before or after skin 310. Preview image 416 may be a representative image where candidate skin 312 is placed prior to skin 310. Preview image 418 may be a representative image where candidate skin 312 is placed after skin 310. If candidate skin 312 is executed prior to skin 310, cats added by execution of skin 310 may be of a default color. If candidate skin 312 is executed after skin 310, cats added by execution of skin 310 may be colored black. In an example, a user may want to only have those preview images displayed in which execution of candidate skin 312 has a visible effect. In this case, only preview image 418 may be displayed for example image 406, as preview image 416 does not depict any effect of execution of candidate skin 312.

Among other potential benefits, a system in accordance with the disclosure may help a user to select an execution order in which to execute multiple skins. Different images may be displayed depending on the placement of a skin in the skin stack. Preview images of the different options may be displayed by an augmented reality device. A user may be able to choose between the various preview images to determine the order of skin execution, based on desired results. As preview images are generated for relevant skins in the skin stack that may affect produced augmented reality data, a user is provided with less overwhelming information than if all skins (including non-relevant skins) in the skin stack were evaluated.

Figure 5:
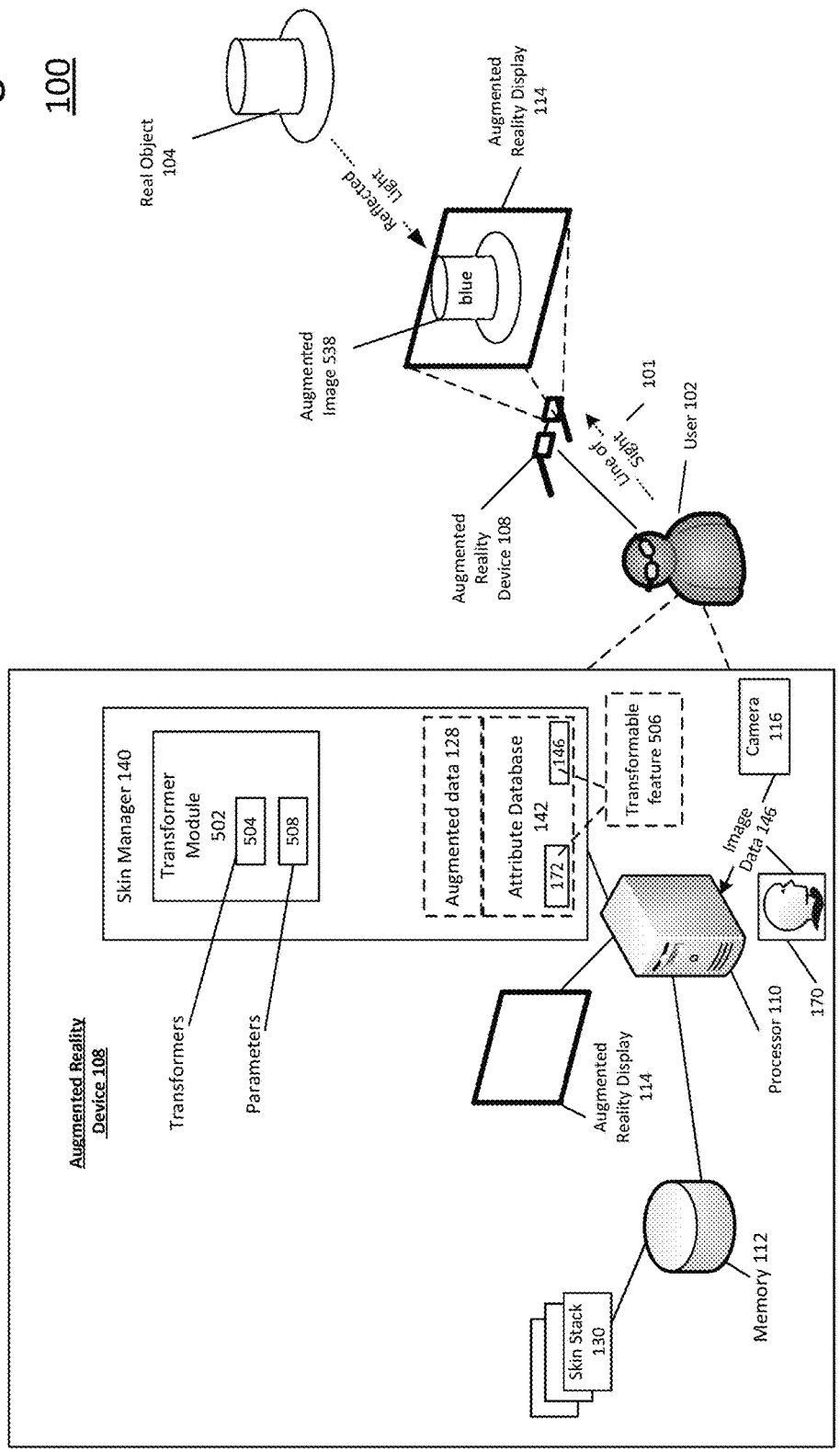
FIG. 5 depicts the example system of FIG. 1 with additional details relating to a transformer module.

FIG. 5 depicts the example system of FIGS. 1, 2, 3 and 4 with additional details relating to a transformer module, arranged in accordance with at least some embodiments described herein. Those components in FIG. 5 that are labeled identically to components of FIGS. 1, 2, 3 and 4 will not be described again for the purposes of clarity and brevity.

Skin manager 140 may include a user interface which may allow a user to create new augmented reality skins. A user may select a pre-programmed transformer, which may include code or other programmable instructions configured to perform one or more transformations of image data 146. The user may select one or more features on which to apply a pre-programmed transformer to create a new augmented reality skin.

Skin manager 140 may include a transformer module 502. Transformer module 502 may be implementable in hardware or may be implementable as some combination of hardware and instructions executable in the hardware. Transformer module 502 may allow user 102 to create one or more skins. Transformer module 502 may provide access to a library of transformers 504 and parameters 508. Transformers 504 may be a series of instructions. Parameters 508 may relate to details on implementation of a transformer. Transformable features 506 may be features upon which a skin created by transformer module 502 may register. Transformable features 506 may be stored in attribute database 142.

In an example, user 102 may wish to create an augmented reality skin that changes the color of hats to blue on augmented reality display 114. Transformer 504 may be instructions which are configured to receive transformable features 506 and/or parameters 508 as inputs in order to perform a specified action. User 102 may select the transformer 504 "blue" from a library of transformers 504. Transformer 504 "blue" may be configured to take a transformable feature 506 as an input. In the current example, user 102 may select "hat" as transformable feature 506. If one or more hats are identified in metadata 172 as features of image data 146, transformer "blue" may produce augmented data that, if rendered, displays blue hats overlaying hats of real object 104. In the example, augmented image 538 may display a blue hat which overlays real object 104.

Other examples of transformers 504 may include instructions configured to erase an object, add an object, replace one object with another, scaling instructions which may adjust the size of one or more objects based on parameters 508, etc. In some examples, parameters 508 may include size specifications, color shades, framing, border size, positioning information, etc. For example, a border transformer 504 may change the color of the edge (the feature) of an image to a red color. The border transformer may take transformable feature 506 (edge) and parameter 508 (red) as inputs. In another example, user 102 may select a transformable feature 506 input of "cats" and a parameter 508 of a specified percentage of the border of the transformable feature to be colored. For example, user 102 may specify 10% as parameter 508. In the example, 10% of the edge of the cat image may be turned red.

In an example, user 102 may combine multiple transformers to create a new augmented reality skin. For example, user 102 may select a transformer 504 that adds hats to transformable feature 506 "human heads." User 102 may also select transformer 504 that turns hats blue. User 102 may combine the two transformers such that blue hats are added to human heads. The output of the "adds hats" transformer 504 may serve as the input, or a pipe, to the "turns hats blue" transformer 504. The combination of transformers may be stored in the transformer library as a new transformer. Application of this new transformer may result in blue hats being applied to human heads. The transformer may be applied and placed in skin stack 130 as a new augmented reality skin.

The described system may also allow users with little programming knowledge to create new skins through the use of transformers. Transformers may enable developers to innovate and create new skins more quickly and simply as developers may simply build off pre-existing transformers. Additionally, users may combine multiple different transformers to create an almost endless variety of new and different skins. A library of different transformers may give a user many options for creating new skins. Such skins may be shared with other users.

Figure 6:
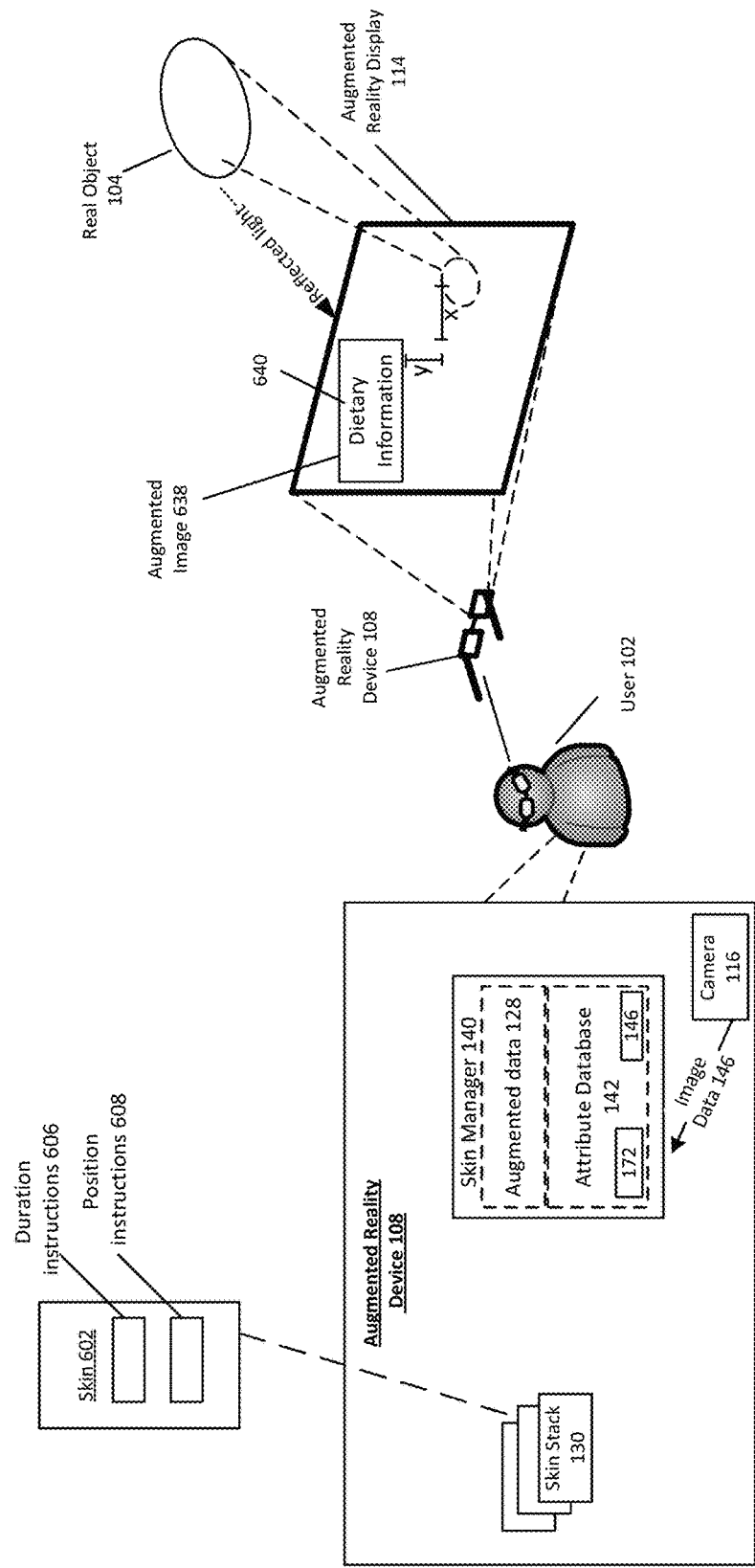
FIG. 6 depicts the example system of FIGS. 1, 2, 3, 4 and 5 with additional details relating to the skin manager configured to output persistent visual information.

FIG. 6 depicts the example system of FIGS. 1, 2, 3, 4 and 5 with additional details relating to the skin manager outputting persistent visual information, arranged in accordance with at least some embodiments described herein. Those components in FIG. 6 that are labeled identically to components of FIGS. 1, 2, 3, 4 and 5 will not be described again for the purposes of clarity and brevity.

Some augmented reality skins may be configured to output persistent visual information to augmented reality display 114. For example, a particular skin may recognize a person and display the person's name next to the person's head for a period of 5 seconds. In such cases, skin manager 140 may be configured to perform image processing operation, such as identification of features in metadata, resource provisioning and/or processing of image data, one time and then to render the resulting image for a defined number of frames or amount of time.

In an example, skin manager 140 may identify features of objects found in image data 146. Skin manager 140 may store identified features of objects in attribute database 142. The features may be implicated by a skin 602. For example, skin manager 140 may store metadata 172 in attribute database 142. Skin 602 may be executed when a feature upon which skin 602 registers is present among features of image data 146 and identified in metadata 172.

Augmented reality device 108 may be configured to receive image data 146 representing real object 104. Augmented reality device 108 may output a frame that includes an augmented image 638. To maintain an integrity of a user's experience, augmented reality device 108 may output thirty to sixty frames per second where each frame includes augmented image 638. Skin 602 may include duration instructions 606. Duration instructions 606 may be instructions for skin manager 140 to display augmented image 638 produced by skin 602 for a specified number of frames. Based on duration instructions 606, skin manager 140 may continue to display the augmented image 638 at the appropriate location without any further image analysis for the specified number of frames.

In an example, skin 602 may include instructions effective to perform image processing on a plate of food, generate nutrition information, and output nutritional information at a location dictated by the location of the plate of food. In the example, metadata 172 may indicate that a plate of food is among the features present in image data 146. Additionally, metadata 172 may indicate that data relating to the feature "plate of food" are stored at locations x1, y1 to x2, y2. Skin manager 140 may execute skin 602 and may perform image processing to determine dietary information related to the food. Skin 602 may produce augmented data that, when rendered, displays dietary information about the food in a text pane displayed on augmented reality display 114. Dietary information 640 may be output at a location dictated by the location of the feature "plate of food."

After generating the dietary information for the first frame, skin manager 140 may not be required to identify the feature "plate of food" and perform the image processing for subsequent frames for which augmented image 638 is to be displayed. Additionally, skin manager 140 may not be required to calculate dietary information for each frame. The image analysis needs only be performed for the first frame. Thereafter, augmented image 638, including dietary information 640, may be displayed for a number of frames specified by duration instructions 606 of skin 602.

Additionally, skin 602 may include position instructions 608. Position instructions 608 may specify a position on augmented reality display 114 in which to display augmented image 638. Position instructions 608 may specify an exact location on augmented reality display or may specify a location relative to a particular feature. For example, position instructions 608 may specify that augmented image 638 be displayed at a position X pixels to the left and Y pixels above a feature. The feature may be stored as metadata 172. In an example where the plate of food has moved during the time interval that augmented image 638 is to be displayed, metadata 172 may be updated to reflect the new location of the feature. In the example, augmented image 638 may be displayed at a position specified by position instructions 608 for a number of frames specified by duration instructions 606 without further image analysis. Skin manager 140 may analyze metadata 172, determine the current location of the feature, and then output augmented image 638 based on the location of the feature.

Among other potential benefits, skin processing efficiency may be further improved by displaying skins for specified durations in specified positions without any further image processing beyond the initial rendering of the augmented data. For example, the name of a person may be displayed near the person's face for three hundred frames, although the relevant image processing may have only been performed for the first frame. Improving processing efficiency has the incidental benefit of reduction of device power consumption, allowing for longer battery life in portable augmented reality devices.

Figure 7:
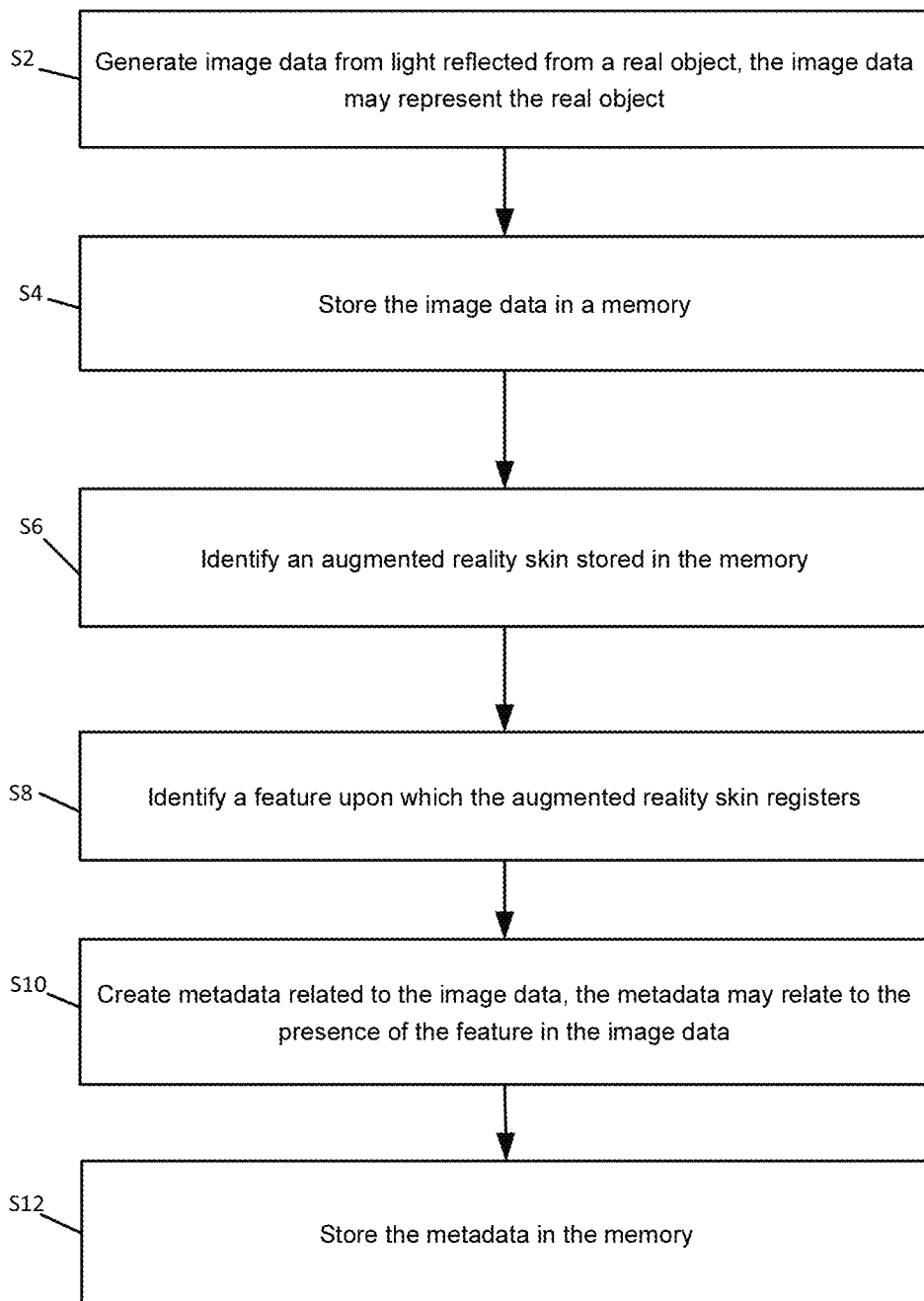
FIG. 7 depicts a flow diagram for an example process for implementing an augmented reality skin manager.

FIG. 7 depicts a flow diagram for example process for implementing an augmented reality skin manager, arranged in accordance with at least some embodiments described herein. In some examples, the process in FIG. 7 could be implemented using system 100 discussed above and could be used to an augmented reality device. An example process may include one or more operations, actions, or functions as illustrated by one or more of blocks S2, S4, S6, S8, S10 and/or S12, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 7 may be used by an augmented reality device that includes a skin manager, such as skin manager 140, as described above. The skin manager may be configured to be in communication with a processor and a memory.

Processing may begin at block S2, "Generate image data from light reflected from a real object, the image data may represent the real object." At block S2, image data may be generated from light reflected from a real object. The image data may represent the real object. A camera may capture the light reflected from the real object.

Processing may continue from block S2 to block S4, "Store the image data in a memory." At block S4, the image data may be stored in a memory.

Processing may continue from block S4 to block S6, "Identify an augmented reality skin stored in the memory." At block S6, an augmented reality skin stored in the memory may be identified. One or more restrictions on execution of the augmented reality skin may be defined. The one or more restrictions may include one or more global constraints that prevent the augmented reality skin from altering at least a portion of the image data. The restrictions may include required resources. Execution of an augmented reality skin may be denied when a determination is made that execution of the augmented reality skin would violate at least one of the restrictions. The global constraints may relate to one or more of security, privacy or visual appearance of one or more objects represented by the image data.

Processing may continue from block S6 to block S8, "Identify a feature upon which the augmented reality skin registers." At block S8, a feature upon which the augmented reality skin registers may be identified. The feature may be a first feature.

Processing may continue from block S8 to block S10, "Create metadata related to the image data, the metadata may relate to the presence of the feature in the image data." At block S10, metadata related to the image data may be created. The metadata may relate to the presence of the feature in the image data. The metadata may relate to a location, color, position, size, transparency, depth and/or identification of features in the image data.

Processing may continue from block S10 to block S12, "Store the metadata in the memory." At block S12, the metadata may be stored in the memory.

A request may be received to execute the augmented reality skin. A determination may be made whether the feature upon which the augmented reality skin registers is present in the metadata. Execution of the augmented reality skin may be denied, based on a determination that the feature upon which the particular augmented reality skin registers is not present in the metadata.

Figure 8:
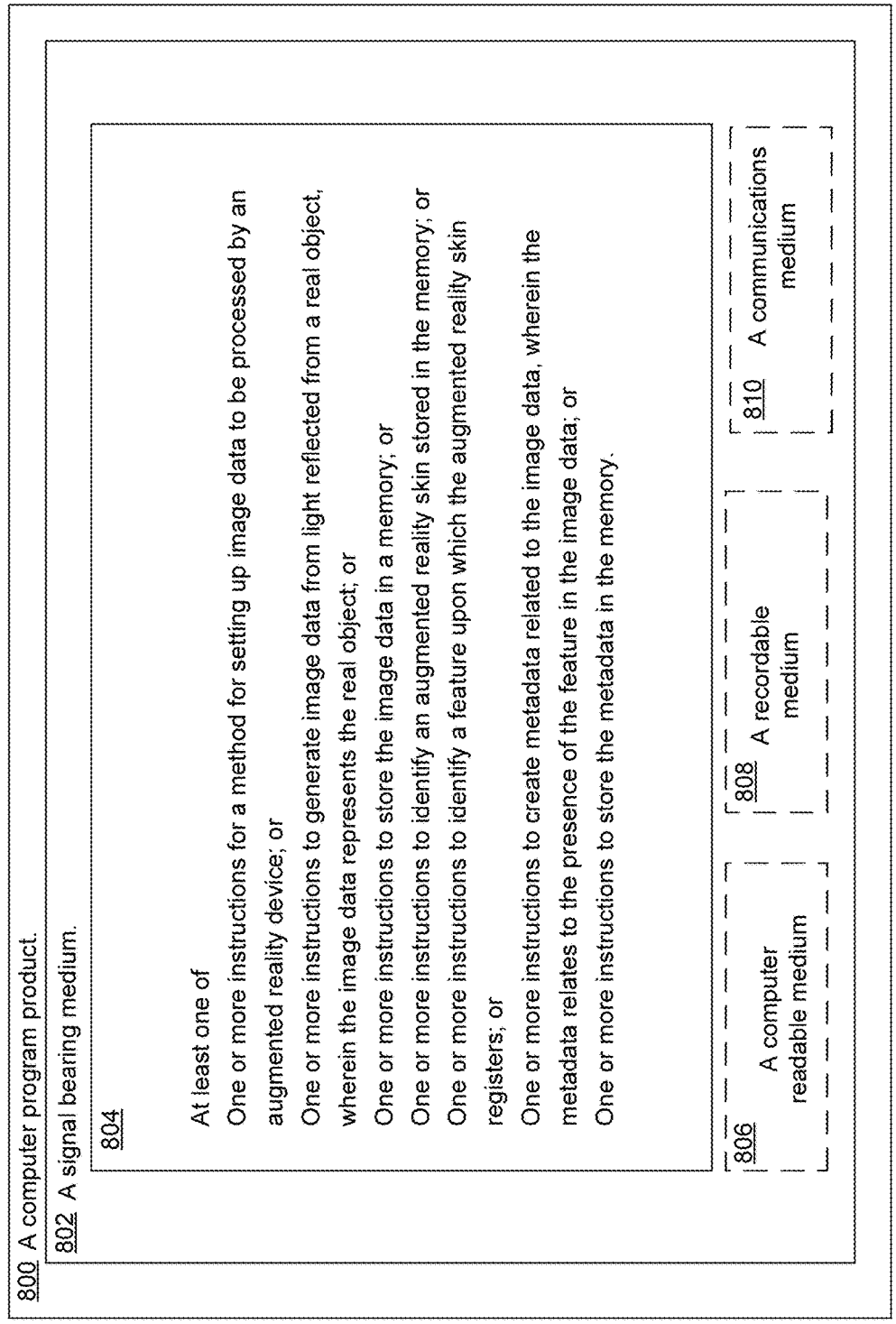
FIG. 8 illustrates an example computer program product that can be utilized to implement an augmented reality skin manager.

FIG. 8 illustrates an example computer program product 800 that can be utilized to implement an augmented reality skin manager arranged in accordance with at least some embodiments described herein. Program product 800 may include a signal bearing medium 802. Signal bearing medium 802 may include one or more instructions 804 that, in response to execution by, for example, a processor, may provide the functionality and features described above with respect to FIGS. 1-7. Thus, for example, referring to system 100, skin manager 140 may undertake one or more of the blocks shown in FIG. 8 in response to instructions 804 conveyed to system 100 by medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the system 100 by an RF signal bearing medium 802, where the signal bearing medium 802 is conveyed by a wireless communications medium 810 (e.g., a wireless communications medium conforming with the IEEE 802.11 standard).

FIG. 9 is a block diagram illustrating an example computing device 900 that is arranged to implement an augmented reality skin manager, arranged in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, one or more programmable circuits 966 and program data 924. Application 922 may include an augmented reality skin manager algorithm 926 that is arranged to perform the functions and operations as described herein including those described with respect to FIGS. 1-8 in connection with system 100. Program data 924 may include augmented reality skin manager data 928 that may be useful to implement an augmented reality skin manager as is described herein. In some embodiments, application 922 may be arranged to operate with program data 924 in cooperation with operating system 920 such that an augmented reality skin manager may be provided. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to set up image data to be processed by an augmented reality device, the method comprising, by a processor:
   generating image data from light reflected from a real object, wherein the image data represents the real object;
   storing the image data in a memory;
   identifying an augmented reality skin stored in the memory, wherein the augmented reality skin comprises instructions to identify a reference point of a feature of the real object within the image data;
   analyzing the augmented reality skin to identify the reference point of the feature of the real object within the image data on which the augmented reality skin would register upon execution of the augmented reality skin;
   creating metadata related to the image data, wherein the metadata relates to the presence of the feature, on which the augmented reality skin would register upon execution of the augmented reality skin, in the image data;
   storing the metadata related to the image data that includes the identification of the presence of the feature in the image data, in the memory; and
   updating the metadata after execution of the augmented reality skin.

2. The method of claim 1, wherein the augmented reality skin includes a first augmented reality skin, wherein the feature includes a first feature of the real object within the image data, and wherein the method further comprises, by the processor:
   receiving a request to execute a second augmented reality skin;
   analyzing the second augmented reality skin to identify a reference point of a second feature of the real object within the image data on which the second augmented reality skin would register upon execution of the second augmented reality skin;
   determining whether the second feature is present in the metadata;
   executing the second augmented reality skin on the image data to produce augmented data, in response to a determination that the second feature is present in the metadata; and rendering the augmented data on a display to produce an augmented image.

3. The method of claim 2, further comprising, by the processor, updating the metadata based on differences between the augmented data and the image data.

4. The method of claim 1, wherein the augmented reality skin includes a first augmented reality skin, and wherein the method further comprises, by the processor:

receiving a first request to execute the first augmented reality skin;
receiving a second request to execute a second augmented reality skin;
determining a first amount of time between when the image data was generated and when the first augmented reality skin is to be executed;
determining a second amount of time between when the image data was generated and when the second augmented reality skin is to be executed; and
executing the first augmented reality skin prior to the second augmented reality skin when the first amount of time is less than the second amount of time.

5. The method of claim 1, further comprising, by the processor:
receiving a request to execute the augmented reality skin;
determining whether the feature, upon which the augmented reality skin registers, is present in the metadata; and
denying execution of the augmented reality skin based on a determination that the feature, upon which the augmented reality skin registers, is not present in the metadata.

6. The method of claim 1, wherein the metadata relates to a location, color, position, size, transparency, depth and/or identification of features in the image data.

7. The method of claim 1, further comprising, by the processor, defining one or more restrictions on execution of the augmented reality skin.

8. The method of claim 7, wherein the one or more restrictions comprise one or more of memory, processing power, latency guarantees and/or refresh rates allocated for the augmented reality skin.

9. The method of claim 7, wherein the one or more restrictions comprise one or more global constraints that prevent the augmented reality skin from altering at least a portion of the image data.

10. The method of claim 9, wherein the one or more global constraints relate to one or more of security, privacy or visual appearance of one or more objects represented by the image data.

11. The method of claim 1, further comprising capturing, by a camera, the light reflected from the real object.

12. A method to determine whether to execute an augmented reality skin by an augmented reality device, the method comprising, by a processor:
generating image data from light reflected from a real object, wherein the image data represents the real object;
storing the image data in a memory;
identifying a first augmented reality skin to be applied to the image data;
analyzing the first augmented reality skin to identify a feature on which the first augmented reality skin would register upon execution of the first augmented reality skin;
receiving a first request to execute the first augmented reality skin;
receiving a second request to execute a second augmented reality skin;
defining one or more restrictions on the execution of the first augmented reality skin or the second augmented reality skin;
determining whether the execution of the first augmented reality skin or the second augmented reality skin would violate at least one of the one or mroe restrictions, wherein the determination includes:
determining a first amount of time between when the image data was generated and when the first augmented reality skin is to be executed, and
determining a second amount of time between when the image data was generated and when the second augmented reality skin is to be executed;
executing the first augmented reality skin prior to the second augmented reality skin, when the determination indicates that the execution of the first augmented reality skin or the second augmented reality skin would not violate the at least one of the one or more restrictions, wherein the one or more restrictions include that the first amount of time is less than the second amount of time; and
updating the metadata after executing the augmented reality skin.

13. The method of claim 12, wherein the one or more restrictions relate to one or more of memory, processing power, latency guarantees and/or refresh rates.

14. The method of claim 12, wherein the one or more restrictions further include one or more global constraints that prevent one or more augmented reality skins of the first augmented reality skin and the second augmented reality skin from altering at least a portion of the image data.

15. The method of claim 14, wherein the one or more global constraints relate to one or more of security, privacy or visual appearance of one or more objects represented by the image data.

16. The method of claim 12, wherein:
the one or more restrictions further include allocated resources; and
the method further comprises denying execution of the first augmented reality skin or the second augmented reality skin, when the determination indicates that the execution of the first augmented reality skin or the second augmented reality skin would violate the at least one of the one or more restrictions.

17. The method of claim 12, further comprising, by the processor, monitoring resource use of the first augmented reality skin or the second augmented reality skin during the execution.

18. The method of claim 17, further comprising, by the processor, terminating the execution of the first augmented reality skin or the second augmented reality skin when the resource use exceeds allocated resources identified in the one or more restrictions.

19. The method of claim 12, further comprising capturing, by a camera, the light reflected from the real object.

20. An augmented reality device, comprising:
a memory that includes an augmented reality skin;
a processor configured to be in communication with the memory; and
a camera configured to be in communication with the processor,
wherein the camera is effective to capture light reflected from a real object,
and wherein the processor is effective to:
generate image data from the light, wherein the image data represents the real object;
store the image data in the memory;
identify the augmented reality skin stored in the memory;
analyze the augmented reality skin to identify a feature, on which the augmented reality skin would register upon execution of the augmented reality skin, wherein the augmented reality skin comprises instructions to identify a reference point of the feature of the real object within the image data;

create metadata related to the image data, wherein the metadata relates to the presence of the feature, on which the augmented reality skin would register upon execution of the augmented reality skin, in the image data;

update the metadata upon the execution of the augmented reality skin; and store the metadata related to the image data that includes the identification of the presence of the feature in the image data, in the memory.

21. The augmented reality device of claim 20, wherein the processor is further effective to:

receive a request to execute the augmented reality skin;

determine whether the feature is present in the metadata;

execute the augmented reality skin to produce augmented data, based on a determination that the feature is present in the metadata; and render the augmented data on a display to produce an augmented image.

22. The augmented reality device of claim 20, wherein the processor is further effective to update the metadata based on differences between the augmented data and the image data.

* * * * *